US007156371B2

(12) United States Patent
Engl et al.

(10) Patent No.: US 7,156,371 B2
(45) Date of Patent: Jan. 2, 2007

(54) DEVICE FOR OPENING OR CLOSING AN OPENING, IN PARTICULAR A BOTTOM OPENING OF A MATERIAL BUNKER FOR A BLAST FURNACE

(75) Inventors: Frank Engl, Alsdorf (DE); Franz-Josef Irnich, Hürtgenwald (DE); Arno Korbmacher, Düren (DE)

(73) Assignee: Z&J Technologies GmbH, Duren (DE)

( * ) Notice: Subject to any disclaimer, the term of this patent is extended or adjusted under 35 U.S.C. 154(b) by 131 days.

(21) Appl. No.: 10/869,473

(22) Filed: Jun. 16, 2004

(65) Prior Publication Data

US 2004/0262324 A1 Dec. 30, 2004

(30) Foreign Application Priority Data

Jun. 17, 2003 (DE) ................................ 103 27 276

(51) Int. Cl.
*F16M 13/00* (2006.01)

(52) U.S. Cl. .................... 251/229; 222/185.1; 220/817

(58) Field of Classification Search ................ 251/229; 222/185.1; 220/817, 818
See application file for complete search history.

(56) References Cited

U.S. PATENT DOCUMENTS 4,820,105 A 4/1989 Legille et al.
5,797,585 A * 8/1998 Auvity ........................ 251/80

FOREIGN PATENT DOCUMENTS

DE 3834969 A1 4/1990
JP 10339582 12/1998

OTHER PUBLICATIONS

European Search Rep. for App. No. 04 01 2112, Aug. 24, 2005.
European Search Rep. for App. No. 01 01 2112, Aug. 24, 2005.

* cited by examiner

*Primary Examiner*—J. Casimer Jacyna
(74) *Attorney, Agent, or Firm*—Andrus, Sceales, Starke & Sawall, LLP

(57) ABSTRACT

A device for closing or opening an opening, in particular a filling or bottom opening (11) of a material bunker (12) arranged above the furnace throat of a blast furnace, including a tilting disk (10) connectable to a drive. The tilting disk (10) is articulated to two swivel arms (15, 16) pivotably mounted about two swivel axes (13, 14) extending parallel to each other, and to be more precise, in such a manner that the edge areas of the tilting disk (10) situated on a perpendicular to the swivel axes (13, 14) of the two swivel arms (15, 16), upon a movement of these arms, move from the closed into the opened position, and vice versa, along oppositely directed arc paths (23, 24).

8 Claims, 3 Drawing Sheets

DEVICE FOR OPENING OR CLOSING AN OPENING, IN PARTICULAR A BOTTOM OPENING OF A MATERIAL BUNKER FOR A BLAST FURNACE

CROSS REFERENCE TO RELATED APPLICATION

The present application claims priority from German Application No. 103 27 276.3 filed on Jun. 17, 2003.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The invention relates to a device for opening or closing an opening, in particular a filling opening and bottom opening of a material bunker arranged above the furnace throat of a blast furnace, including a tilting disk connectable to a drive.

Conventionally, shut-off flaps are pivoted about a swivel axis from the closed into the open position, and vice versa, with the swivel axis being able to be coupled to a manual or electromotive drive. In order to prevent the tilting disk from unnecessarily impeding the material flow passing through the opened opening, the tilting disk, as a rule, is articulated to one flap edge. In this case, the tilting disk, in the opened position, may essentially completely clear the flow opening. However, the disadvantage of this embodiment is that the tilting disk tilts away from the opening by a relatively wide distance. In the case of a bottom opening, the opening has to be arranged relatively high above the bulk goods so as to avoid a collision between the bulk goods and the tilting disk. In blast furnaces, this means an additional height of the material bunker with correspondingly higher constructional costs for the latter and also for the material conveying means that accordingly has to be built higher.

BRIEF SUMMARY OF THE INVENTION

The present invention therefore is based on the object of creating a device of the aforementioned kind, which device is constructed considerably more compactly, and above all lower, and yet functionally safe.

According to the invention, this object is achieved by the characterizing provisions of claim 1.

The essence of the present invention hence resides in the fact that the tilting disk is articulated to two swivel arms pivotably mounted about two swivel axes extending parallel to each other, in such a manner that the edge areas of the tilting disk situated perpendicular to the swivel axes of the two swivel arms, upon movement of these arms, move from the closed into the opened position, and vice versa, along oppositely directed arc paths. During movement from the closed into the opened position, the tilting disk is first raised from the opening. This raising movement is superimposed by a lateral displacement and tilting movement of the disk so that the disk is completely moved out away from the opening area without being positioned perpendicular to the opening plane with the full diameter. In this manner, a greater degree of filling is possible below the opening without the risk of a collision between the bulk goods and the tilting disk. Preferably, the swivel arms are dimensioned and articulated to the tilting disk in such a manner that the tilting disk, in the opened position, at the side of the opening facing the first swivel arm extends outside of the opening with its side facing away from the opening, obliquely in a downward direction. In this final position, the tilting disk is outside of the opening and essentially above it, in particular above the swivel area of the opening. During the closing process from the opened position, the tilting disk is pivoted in the inverse direction into and onto the opening.

The aforementioned reiterated superimposed tilting-translation movement of the tilting disk is preferably achieved in that the one of the swivel arms is articulated to the edge area of the tilting disk, while the other swivel arm is configured like a crankshaft with a cranking portion where the second articulation of the tilting disk takes place, and that in a structurally particularly advantageous manner, at the side of the flap facing away from the opening. The swivel axis of the second swivel arm extends approximately in the plane of the opening to be closed, while the cranking portion—as already mentioned—is articulated to the side of the tilting disk facing away from the opening. Due to the swivel arm being configured in this manner and the articulation thereof, one obtains the desired tilting movement of the tilting disk about a spatial axis that extends parallel to the swivel axes of the two swivel arms and at the same time moves in the space along an arc tilted relative to the longitudinal axis of the opening to be closed, with the final points of this movement being defined by the closing position of the tilting disk, on the one hand, and its opened position, on the other hand.

In order to avoid a collision between the tilting disk and the opening edge, it is particularly practical when the first swivel arm is articulated at a point above the edge of the tilting disk facing the opening. This articulation point may thus be located slightly closer to the opening edge.

In order to move the tilting disk from the closed into the opened position, or vice versa, either the first or the second swivel arm may be able to be coupled to a drive, in particular an electromotive drive.

The circumferential edge of the tilting disk either defines a circle, an ellipse or a polygon, i.e. a triangle, quadrangle, hexagon or octagon.

BRIEF DESCRIPTION OF THE SEVERAL VIEWS OF THE DRAWINGS

A preferred embodiment of the device according to the invention will be described below by means of the drawing. This drawing shows in FIG. 1 a shut-off flap in the closed and partially opened position assigned to a bottom opening, in each case in a schematic side view.

DETAILED DESCRIPTION OF THE INVENTION

Figure 1:
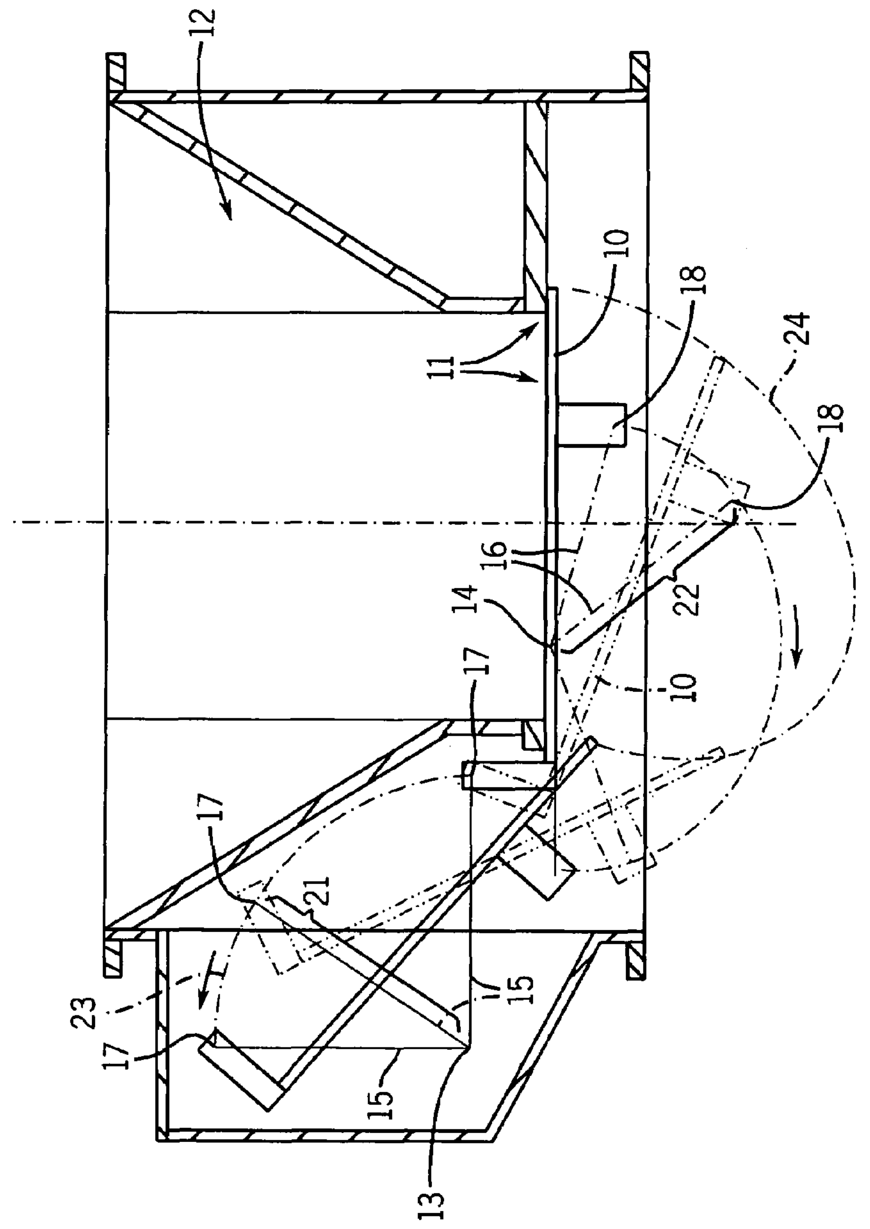
Figure 2:
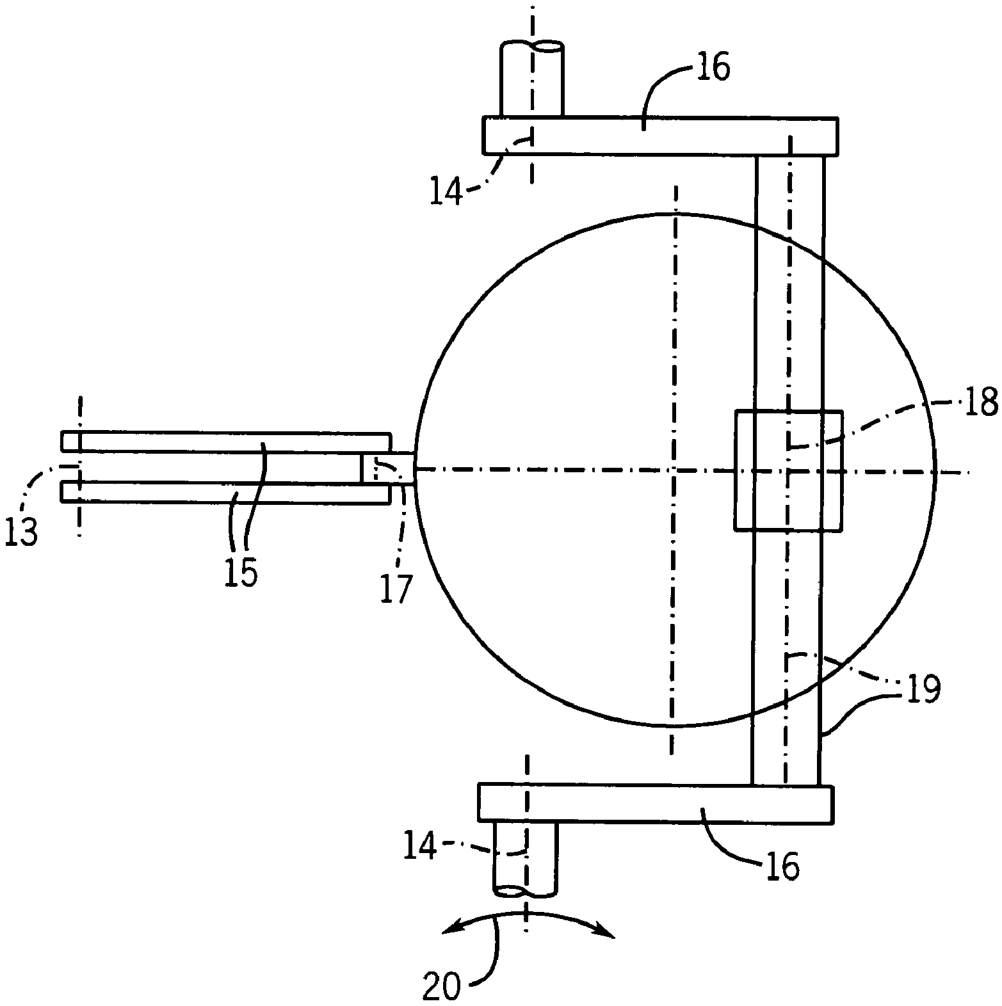
FIG. 2 the swivel construction of the flap according to FIG. 1 in a schematic top view.
Figure 3:
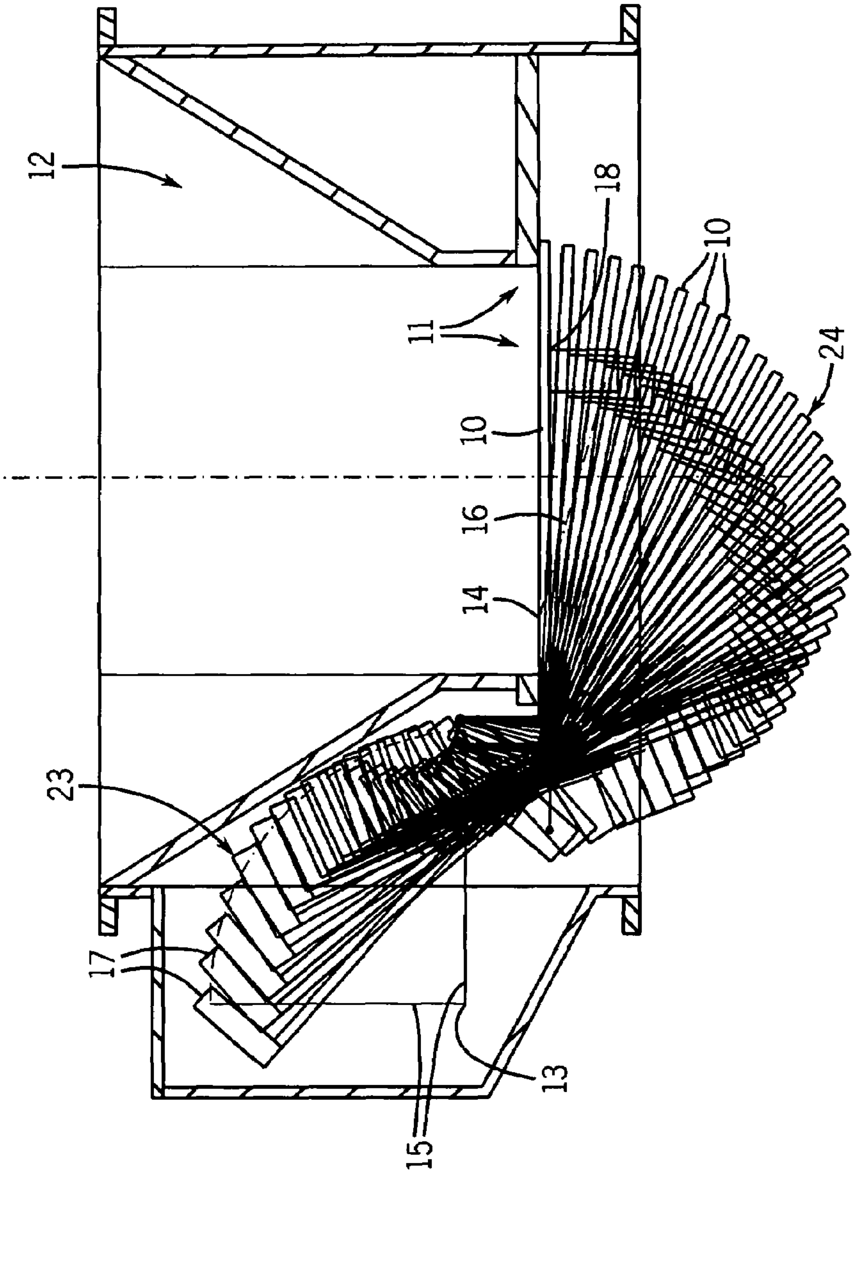
FIG. 3 a representation of the motion sequence of a tilting disk of the shut-off flap according to FIG. 1 from the closed into the opened position, and vice versa, in a schematic side view.

FIGS. 1 through 3 show a shut-off flap having a tilting disk 10 assigned to a bottom opening 11 of a material bunker 12, which may be arranged above the furnace throat of a blast furnace. Specifically, the passage of bulk goods through the bottom opening 11 is concerned with the shut-off flap opened. The tilting disk 10 and the assigned opening edge are configured such that, with the tilting disk closed, a gas-tight closure of the bottom opening 11 is ensured. In particular, as may be clearly seen in FIGS. 1 and 2, the tilting disk 10 of the shut-off flap is articulated to two swivel arms 15, 16 pivotably mounted about two swivel axes 13, 14 extending parallel to each other, and, to be more precise, in such a manner that the edge areas of the tilting disk 10 situated on a perpendicular to the swivel axes 13, 14 of the two swivel arms 15, 16 with a movement of these from the opened into the closed position, and vice versa, move along oppositely directed arc paths 23, 24, as may be seen in FIG. 3. The one swivel arm 15 is articulated 17 in the edge area of the tilting disk 15, while the other swivel arm 16 is configured like a crankshaft with a cranking portion 19 where the second articulation 18 of the tilting disk 10 takes place. The first and second articulations 17 and 18 are also swivel bearings having articulation axes extending in parallel to the swivel axes 13, 14.

The swivel axis 14 of the second swivel arm 16 extends approximately, as may be seen in FIG. 1, in the plane of the opening 11 to be closed. The cranking portion 19 of the second swivel arm 16 is articulated to the side of the tilting disk 10 facing away from the opening 11. Thus, when. pivoting the two swivel arms 15, 16, one obtains the path of movement described above of the tilting disk 10 according to FIG. 3, when moving same from the closed into the opened position or vice versa.

As may also be seen from FIG. 1, the first swivel arm 15 is pivotably mounted above and outside of the opening 11 to be closed (swivel axis 13). Correspondingly, the first swivel arm 15 is articulated to a point 17 above the edge of the tilting disk 10 facing the opening. Thus, a collision-free movement of the tilting disk 10 relative to the edge of the bottom opening 11 is achieved in a most restricted space, i.e. with a compact design.

In the illustrated embodiment, the second swivel arm 16 is supposed to be coupled to a drive not shown in more detail. This drive is outlined in FIG. 2 by a double arrow.

According to FIG. 2, the circumferential edge of the tilting disk 10 has a circular configuration.

Finally, it has to be noted that the swivel arms 15, 16 are of such a size and are articulated to the tilting disk 10 in such a manner that the tilting disk 10, in the opened position, at the side of the opening 11 facing the first swivel arm 15, extends outside of the opening 11 with the side facing away from the opening directed obliquely downwards, as is shown in FIG. 3. Thus, it is ensured that, on the one hand, the tilting disk is completely moved out from the flow path of bulk goods through the opening 11 into a position lateral of this opening and substantially above the same. Moreover, it is ensured that deposits may not form on the tilting disk. Any solid particles will fall off downwards from the obliquely tilted tilting disk in the opened position.

Finally, FIG. 3 shows in particular that due to the superimposed swivel motions of the tilting disk out from the opening area, the tilting disk does not swing very far downwards, with the consequence that the height of the bulk goods may be brought closer to the opening 11 without there being a risk of a collision between the bulk goods and the tilting disk.

Of course, the described construction is also suitable for a tandem bottom opening in a material bunker above the furnace throat of a blast furnace. It is also suitable for any other bottom openings through which bulk goods are to be transported.

As the above description of the exemplary embodiment shows, the swivel axes 13, 14 are stationary axes, while the articulation axes 17, 18 at the tilting disk move along with them. These axes are thus movable axes. Due to this combination, the desired collision-free movement of the tilting disk may be achieved in a most restricted space. The swivel radius of the first swivel arm 15 is designated in FIG. 1 by reference numeral 21, whereas the swivel radius of the second crank swivel arm 16 is outlined in FIG. 1 by reference numeral 22.The first swivel radius 21 is predetermined by the length of the first swivel arm 15, and the second swivel radius 22 is predetermined by the length of the crank arm of the second swivel arm 16.

All of the features disclosed in the application documents are claimed as being invention-relevant, individually or in combination, to the extent that they are novel with respect to the prior art.

LIST OF REFERENCE NUMERALS

10 tilting disk of a shut-off flap
11 bottom opening
12 material bunker
13 swivel axis
14 swivel axis
15 swivel arm
16 swivel arm
17 articulation
18 articulation
19 cranking portion
20 drive
21 swivel radius
22 swivel radius
23 arc path
24 arc path

The invention claimed is:

1. A device for closing or opening an opening, in particular a bottom opening (11) of a material bunker (12) arranged above the furnace throat of a blast furnace, including a tilting disk (10) connectable to a drive, and having a surface lying in a horizontal plane when the disk closes the opening characterized in that the tilting disk (10) is articulated to two swivel arms (15, 16), pivotably mounted about two swivel axes (13, 14) extending parallel to each other, in such a manner that upon a movement of said arms, the disk surface pivots about one of said axes away from the opening toward a first vertical plane while pivoting about said second of said axes toward a second vertical plane positioned above the opening along oppositely directed arc paths (23, 24).

2. The device according to claim 1, characterized in that one of the swivel arms (15) is articulated to an edge area of the tilting disk (10), while the other swivel arm constitutes a crankshaft with a cranking portion (19) where the second articulation (18) of the tilting disk (10) takes place.

3. The device according to claim 1, characterized in that the swivel axis (14) of the second swivel arm (16) extends approximately in the plane of the opening (11) to be closed, while the cranking portion of said swivel arm (16) is articulated to the side of the tilting disk (10) facing away from the opening (11).

4. The device according to claim 2, characterized in that the first swivel arm (15) is pivotably mounted above and outside of the opening (11) to be closed (swivel axis 13).

5. The device according to claim 4, characterized in that the first swivel arm (15) is articulated to a point (17) above an edge of the tilting disk (10) facing the opening (11) (articulation 17).

6. The device according to claim 1, characterized in that either the first (15) or the second (16) swivel arm may be coupled to a drive (20).

7. The device according to claim 1, characterized in that the circumferential edge of the tilting (10) either defines a circle, an ellipse, or a polygon.

8. The device according to claim 1, characterized in that the swivel arms (15, 16) are of such a size and are articulated to the tilting disk (10) in such a manner that the tilting disk (10), in the opened position, at the side of the opening (11) facing the first swivel arm (15), extends outside of the opening (11) with the side facing away from the opening directed obliquely downwards.

* * * * *